United States Patent [19]

Bakhoum

[11] Patent Number: 5,613,001
[45] Date of Patent: *Mar. 18, 1997

[54] DIGITAL SIGNATURE VERIFICATION TECHNOLOGY FOR SMART CREDIT CARD AND INTERNET APPLICATIONS

[76] Inventor: Ezzat G. Bakhoum, P.O. Box 305, Marlton, N.J. 08053

[ * ] Notice: The term of this patent shall not extend beyond the expiration date of Pat. No. 5,267,311.

[21] Appl. No.: 587,026

[22] Filed: Jan. 16, 1996

[51] Int. Cl.⁶ .................. H04L 9/00; H04K 1/00
[52] U.S. Cl. .................. 380/4; 380/23; 380/25; 380/48
[58] Field of Search .............. 380/3, 4, 23, 25, 380/48

[56] References Cited

U.S. PATENT DOCUMENTS

| | | |
|---|---|---|
| 4,446,519 | 5/1984 | Thomas . |
| 4,734,796 | 3/1988 | Grynberg et al. . |
| 4,785,361 | 11/1988 | Brotby . |
| 4,858,036 | 8/1989 | Ginkel . |
| 4,959,861 | 9/1990 | Howlette . |
| 4,980,782 | 12/1990 | Ginkel . |
| 5,122,912 | 6/1992 | Kanota et al. . |
| 5,267,311 | 11/1993 | Bakhoum ............ 380/4 |

OTHER PUBLICATIONS

Pagemaker, Aldus; Ref. Man., pp. 2–18; Dec. 1987; Aldus Corp., Seattle, WA.
Pagemaker, Aldus; User Man., pp. 1–26; Dec. 1987; Aldus Corp., Seattle, WA.

*Primary Examiner*—Stephen C. Buczinski

[57] ABSTRACT

The presently used Asymmetric Digital Signature verification technologies, such as the system of RSA Data Security Corp., require complex mathematical operations for encryption and decryption. As a result, today's smart credit cards have built-in microprocessors, sophisticated arithmetic/logic units, and large amounts of RAM and ROM. For smart card applications, both the cost and the complexity of such systems is prohibitive. The present invention introduces a smart card technology that uses fairly simple logic circuitry, together with a novel handshaking technique, to achieve an outstanding level of security while maintaining simplicity and low cost.

10 Claims, 2 Drawing Sheets

DIGITAL SIGNATURE VERIFICATION TECHNOLOGY FOR SMART CREDIT CARD AND INTERNET APPLICATIONS

BACKGROUND OF THE INVENTION

1. Field of the Invention

This invention relates to a method and mechanism for securing a two-way digital communication against eavesdropping. The applications of particular concern are financial transactions and Internet communications.

2. Description of the Related Art

With the advent of CMOS technology, and the rising financial losses due to credit-card fraud, it was natural for financial institutions to embed digital technology into credit cards and promote what is now known as the "Smart Card". The smart card was developed as an alternative to the traditional magnetic stripe technology, which proved to be vulnerable to snooping and duplication by professional hackers.

Regrettably, the smart cards presently being introduced in the market are based on a 17-year old technology which was first introduced by Rivest, Shamir and Adleman of RSA Corporation (U.S. Pat. No. 4,405,829). While capable of achieving a solid level of security in two-way digital communications, such a technology has the serious deficiency of depending on complex mathematical operations, such as multiplication, exponentiation, and modulo arithmetic. Consequently, most smart cards implement such two-way communication by incorporating on the card an advanced microprocessor, coprocessor, and large amounts of RAM and ROM. Not only such complexity raises the cost of the smart card, but it is further very difficult to embed such complex hardware into a thin, portable package, which must also be rugged to stand mechanical abuse.

The present invention introduces a new method for asymmetric encryption which does not depend on a pair of keys that must be calculated according to a mathematical formula. Rather, the method can use any arbitrary digital message as a test signal. A secret key recorded on an inaccessible ROM in the receiver encrypts the test signal and returns an encrypted message. However, such encryption is done according to a technique which makes it absolutely impossible to decrypt the message in any manner whatsoever and recover the secret key. Moreover, the circuitry required for performing such encryption is fairly simple and does not perform mathematical operations. Accordingly, the invention offers a simple hardware package that can be cheaply and reliably embedded into plastic cards, without a sacrifice in the level of security desired in digital communications.

Other aspects and features of the invention will be more fully apparent from the ensuing disclosure and appended claims.

SUMMARY OF THE INVENTION

In a broad aspect, the present invention relates to a method and mechanism for cryptographic communications that is based on the issuance of a test signal by a first system and the return of a confirmation signal by a second system, in the form of a digital signature. The method does not depend on mathematical operations for encryption and decryption, but rather it depends on a technique that is borrowed from a game of playing cards. The simplicity and the reliability of the technique utilized allows for the encrypting system to use a fairly simple logic circuitry, rather than complex computer hardware, while maintaining an outstanding level of security in cryptographic communications.

DETAILED DESCRIPTION OF THE INVENTION, AND PREFERRED EMBODIMENTS THEREOF

According to the present invention, a few bytes of data will be programmed by the manufacturer of the smart card and stored in internal registers inside the CMOS chip which will be described below. This permanent data will constitute a secret key which will be unique to each user. Such a key will not be given to the user but only to the financial institution issuing the credit card. Normally, such secret key will be programmed on a gate array during the manufacture of the chip, after which the chip will be sealed, thereby protecting all its internal circuitry and preventing access to the stored information.

Figure 1:
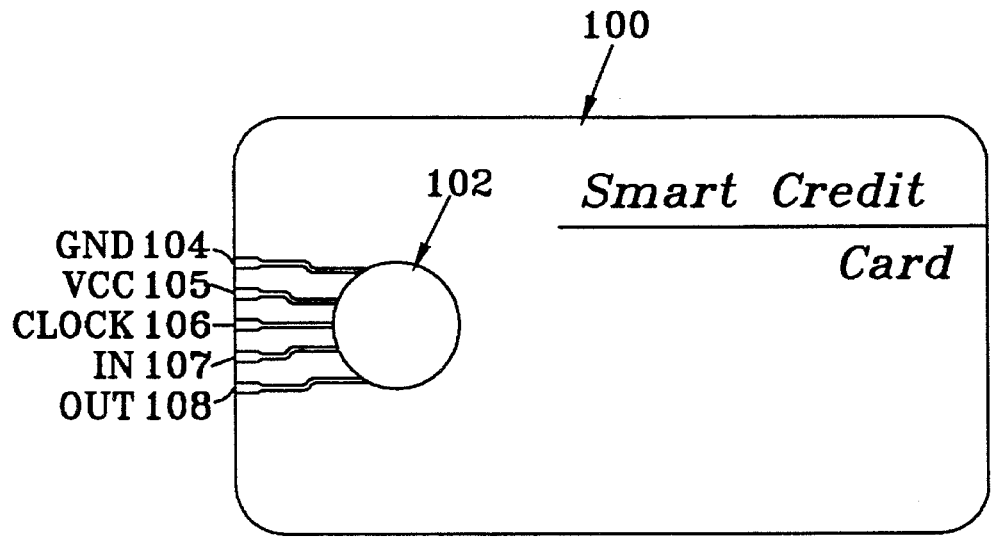
FIG. 1 is a schematic representation of a smart credit card according to the present invention, comprising a one-chip hardware circuit and input/output contact pins.

Reference is now made to FIG. 1 in the drawings. FIG. 1 shows an ordinary plastic credit card 100, on which a smart CMOS chip 102 is laminated. As shown, 5 contact pins or terminals are also laminated on the card. Respectively, those terminals (104 to 108) are: GND, VCC, CLOCK, IN, and OUT. The Gnd and Vcc terminals carry power to the smart card when the card is inserted into an ATM or other vending machine. The Clock terminal carries synchronization pulses as a means for "clocking" the smart card circuit, since the circuit 102 is fairly simple and will not be utilizing an internal clock. The In and Out terminals carry the handshaking information, serially, between the smart card and the remote computer.

Figure 2:
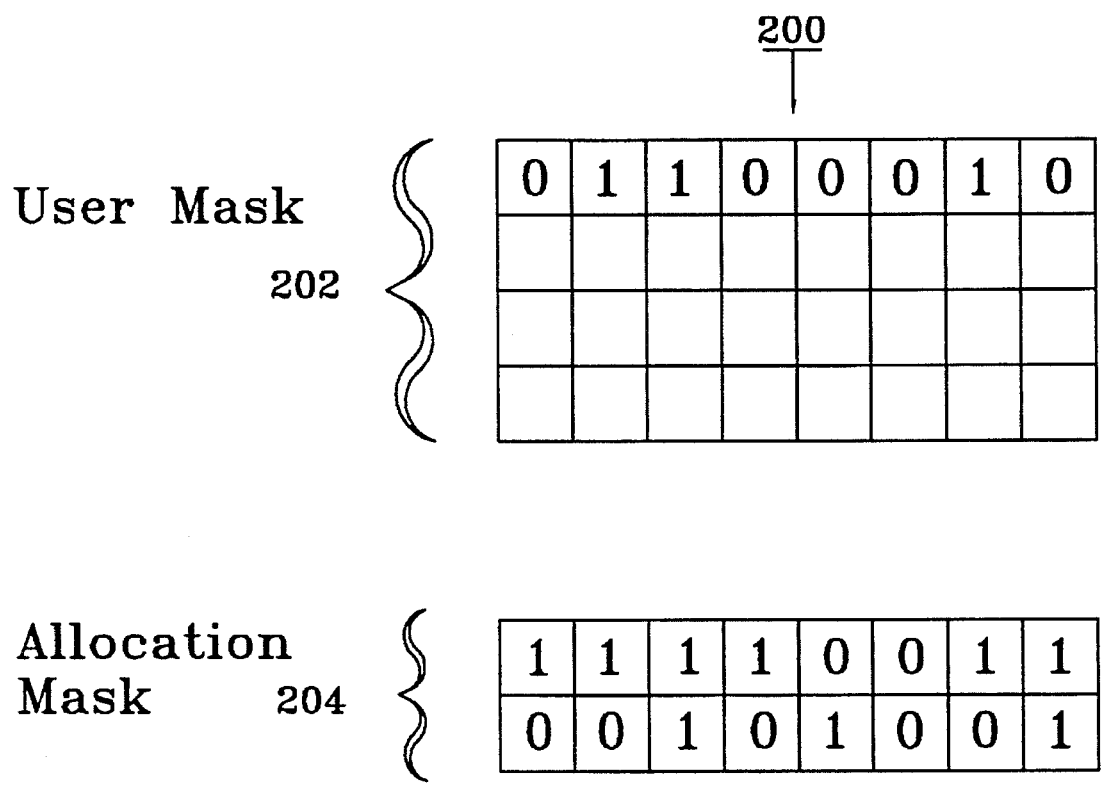
FIG. 2 shows a 6-byte secret key to be programmed and stored inside the inaccessible ROM of the card.

Now, with the basic structure of the device being understood, we shall turn our attention to the internal details of operation of the smart circuit 102. In a two-way handshaking protocol according to the present invention, the remote computer sends a "test" message to the smart card. The card, in turn, encrypts the test message and issues a "confirmation" message to verify its authenticity. The technique which will be now described makes the task of decrypting the confirmation message and recovering the secret key an absolutely impossible task. Referring to FIG. 2, a secret key 200, consisting preferably of 6 bytes, is divided into two different types of masks: a "User mask" 202, consisting of 4 bytes, and an "Allocation mask" 204, consisting of 2 bytes.

An incoming test message, consisting of 4 bytes, will go through a sequence of two logic operations: first, a bitwise INVERT operation, which is determined by the user mask (in the example shown in FIG. 2, the second, third, and seventh bits in the first byte of the test message will be inverted, while the remaining bits in that byte will be left unchanged). A test message may equally be NORed or NANDed with the mask; however such operations are not recommended, since a test message consisting of all 0's or all 1's can sometimes fool a logic system based on these operations. Such a preliminary operation has the purpose of hiding or "masking" the sequence of bits in the test message.

The second operation will be to further scatter the resulting 4 bytes among several bytes of irrelevant data. This is the function of the allocation mask 204. Each half-byte in the allocation mask indicates how each corresponding byte in the masked message should be allocated within a stream of 16 bytes. In the example of FIG. 2, the first byte of data should occupy the 16$^{th}$ position in a stream of 16 bytes, the second byte of data should occupy the 4$^{th}$ position, the third byte of data should occupy the third place in the stream, and the last byte should occupy the 10$^{th}$ position. The result of implementing these two operations in sequence on a test message will be now apparent: first, the data in the 4 bytes resulting from the first masking operation will be unknown because the User's mask is unknown; however, at this stage, the User's mask can be simply recovered by reversing the logic operation. The second operation of scattering the resulting 4 bytes among several bytes of irrelevant data will then achieve the desired goal: since the data in the meaningful 4 bytes is unknown, it will be then impossible to distinguish such data from irrelevant data in a long sequence of bytes. (This method is in fact similar to a card game, where several playing cards are being displayed, with the locations of the significant cards being known only to one player).

As a result, the remote computer issues a test message of 4 bytes and receives a stream of 16 bytes in return, only 4 bytes of which are meaningful. Now, since the secret key is known to the remote computer, then the Allocation mask is known, and hence the locations of those four important bytes are known. By inspecting the four bytes, therefore, the remote computer can simply invert the data in those bytes and recover the User's mask in order to verify the authenticity of the smart card. In the allocation scheme described, the number of possible allocations is given by 16!/12!, or a number in the order of 43,000.

An important question now is: how the irrelevant data should be generated? Clearly, we cannot simply use a random bit generator on the chip; for if a random bit generator is used, a simple trick would be to pass the same test message to the smart card twice, and simply observe the 4 bytes in the resulting sequence which will remain unchanged. Therefore, a "pseudo-random" bit generator must be used. Such a pseudo-random bit generator must be driven by the test message itself so that a repeated test message will result in the same 16-byte pattern. However, another pitfall must be avoided here: clearly, the 16-byte pattern must not be completely predictable; for if such pattern is completely predictable for a given test message, we have not solved our problem.

Figure 3:
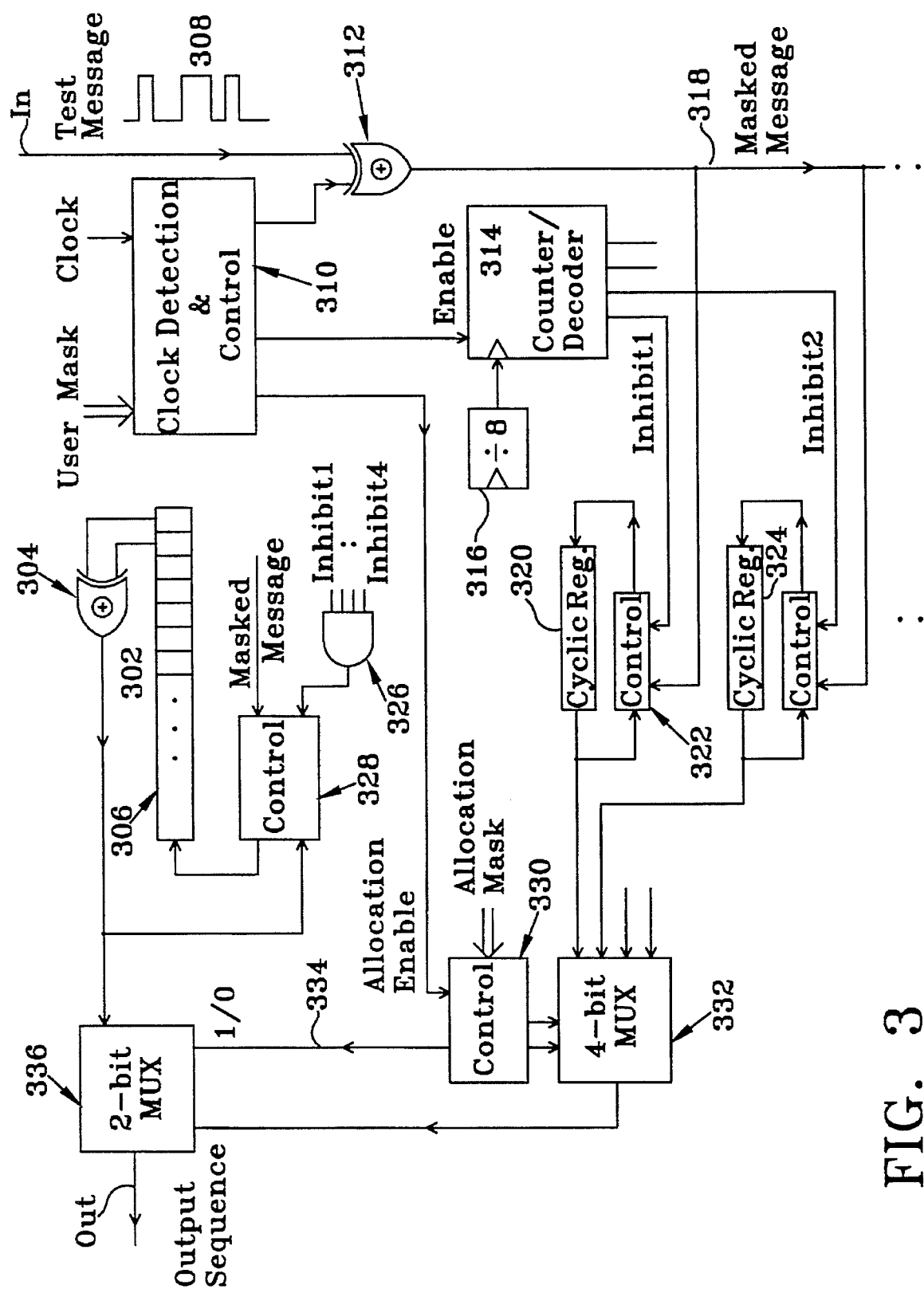
FIG. 3 is a block diagram illustrating the main principle of operation of the hardware circuit of the present invention.

How this can be achieved? The solution can be seen in FIG. 3. FIG. 3 shows a pseudo-random bit generator 302 comprising an XOR gate 304 and a feedback shift register 306 (this pseudo-random bit generator is a well known circuit, and is described more fully in *Principles of CMOS VLSI design,* by Weste and Eshraghian, Addison Wesley, 1985, page 266). For generating a pseudo-random sequence of 16 bytes, a 7-bit shift register is required. Now, how to select such 7 bits for initializing the shift register? Since the test message itself must drive the pseudo-random generator, we can simply route a portion of the masked message to shift register 306 in order to start the 16-byte sequence (it is essential to use a portion of the "masked" message, not the original message, to avoid generating a predictable sequence). But before we go any further, we will have to mention a serious drawback of the pseudo-random bit generator 302: it is true that only 7 bits are required to obtain a 16-byte sequence, however such a circuit can only generate 128 distinct sequences. This can be seen from the fact that a 7-bit shift register can only have 128 different initial states. The problem now is clear: 128 is a very small number. The 128 different sequences could be even written on a single sheet of paper and compared visually to the output sequence. For that purpose, it is preferable to make the shift register 306 4-bytes long, and route the entire masked message to the shift register (this task will be explained in more detail later). An initial state of 4 bytes will result in $2^{32}$, or some 4000 million distinct sequences. But, have we solved our problem? definitely not. It is true that such a large number of sequences cannot be written on a sheet of paper, however, a computer simulation can be done to compare "on the fly" all possible sequences to one particular sequence captured from the smart card, and hence determine the initial state, i.e., the masked message. What, then, is the definite measure of security in such a system? The definite measure of security is the 4 important data bytes which will be "mixed", or inserted in unknown places within the output sequence of bytes, thereby making the sequence itself indistinguishable (we recall, again, the idea of the playing cards). To summarize the process: the masked test message is scrambled by the pseudo-random bit generator to generate a 16-byte sequence; and, simultaneously, the masked message itself is inserted at predetermined locations within the resulting sequence.

If space on the VLSI chip permits, a secret key of more than 6 bytes can be used for added security.

It should be noted that, for proper protection, the User's mask must not be "sparse" in nature; for if a user mask like, for example, 00 . . . 01 is used, we have simplified the job for a professional hacker (this can be seen if a test message of all 0's or all 1's is used with such a mask. In this case, the resulting sequence will be near the very beginning or the very end of the list. A famous example in everyday's life is the combination lock. We never set the combination of such locks to be 000 or 999). This is usually not a problem if the financial institution has to select 4 different bytes for each user, or $2^{32}$ combinations in total, since any financial institution is not likely to have such a huge number of customers. Referring now to FIGS. 1, 2, and 3, the functionality of the smart card will be explained in detail:

When the smart card is first inserted into the card reader of an ATM or other vending machine, a mechanical switch on the card reader will activate the Clock signal that is fed to the smart card, after a predetermined delay. Normally, the signal on the Clock terminal will be maintained Low or High, and will start pulsating after the lapse of the predetermined time delay. At the same instant where the clock pulses are started, a test message 308 will be presented at the Input terminal of the card, as a long sequence of 4 bytes. That incoming test message is fed serially to a circuit 310 which is activated by the edge of the first clock pulse. When such edge is detected, the circuit 310 starts routing the User mask bits, serially, to an XOR gate 312, where the incoming bits of the test message 308 are properly inverted (the reader can verify that an XOR gate will indeed perform an INVERT operation, determined by a mask, where both the mask bit and the data bit are given as inputs to such gate). At the same instant, an Enable signal is issued to a counter/decoder unit 314, having four active-low outputs, labeled Inhibit1–Inhibit4. The counter/decoder unit 314 is clocked by a "divide-by-eight" circuit 316, by means of which the Inhibit outputs are activated sequentially, one every eight clock pulses. As a result, when the Enable signal is received, Inhibit1 becomes active for a duration of 8 clock pulses, during which the first byte of the masked message 318 is transferred to a cyclic shift register 320, of which a total of 4 registers exist. The cyclic register 320 is equipped with a control unit 322, and similarly all other cyclic registers. The control unit 322 has the purpose of detecting an active Inhibit signal and inhibiting the cyclic register from operating in a cyclic mode. When Inhibit1 becomes active, for instance, the register 320 does not operate in a cyclic mode, but instead the first byte of data is transferred to the register. During the following period of 8 clock pulses, Inhibit2 becomes active, while all the others are inactive. As a result, the control unit 322 opens the feedback path, and register 320 operates in a cyclic mode; while the next cyclic register, 324, accepts the second byte of the masked message; etc. When the counter determines that 4 bytes have been received, the control unit 310 removes the Enable signal, and the Inhibit outputs are latched high (disabled). (Both logic units 310 and 314 are fed from a single counter. Such detail is not shown in FIG. 3).

As a result of the foregoing, each of the four bytes of the masked message become trapped in a cyclic register, and starts rotating inside the register once the Inhibit signal is disabled (needless to say, all such shift registers must be clocked). Meanwhile, the masked message is also transferred, as a sequence of 4 bytes, to the pseudo-random bit generator 302, discussed previously. This task is simply implemented by means of a four-input AND gate 326, which gives an active signal if any of the four Inhibit inputs is active. A control unit 328, upon detecting the active signal, disables the feedback to shift register 306 and routes the masked password instead.

When the counter reaches the 4-byte count, the control unit 310 disables the decoder unit 314, as explained previously, and issues an Allocation Enable command to a control unit 330. The control unit 330 starts reading the two Allocation Mask bytes and correspondingly activates a 4-bit multiplexer 332, such multiplexer being fed from the four cyclic shift registers, starting with register 320. The unit 330 must also be linked to the counter. After the 4-byte count is reached, the counter is reset, and the count then proceeds from OH to FH (one count for each byte in the output sequence). At each count, the control unit 330 compares the value of the counter to the value of each of the four half-bytes in the Allocation Mask. If the two values match, one of the trapped bytes in the four cyclic shift registers will be routed to the output, by means of a proper selection signal issued to multiplexer 332. The control unit 330 features a special output line 334 which carries a signal of either 0 or 1. If one of the trapped bytes in the cyclic registers is being selected, the signal on line 334 is 1 and the output of multiplexer 332 appears at the output of multiplexer 336. If, however, none of the trapped bytes is selected, the signal 334 is 0 and the output of the pseudo-random bit generator is selected by the output multiplexer 336.

Of course, after the initial transfer of 4 bytes to the smart card, the card reader will then switch to the receiving state and starts fetching data from the output terminal of the card. If space on the VLSI chip of the card permits, a further refinement which will enhance the reliability of data transmission will be to incorporate on the chip a special unit (not shown in FIG. 3) for writing a burst of Sync pulses to the card reader before the transmission of the output sequence begins. (The use of synchronization pulses is a reliable technique for securing the accuracy of digital communications over a serial link).

We will finally have to mention that the logic gate 304 that is used in the pseudo-random bit generator cannot in reality be a simple XOR, gate. It can be observed that, in this case, if a particular test message and its complement are used, the two resulting sequences will be identical; however, the four hidden bytes of the masked test message will not be identical in the two sequences. In fact, such four bytes will be complemented in the second sequence, which will allow easy identification of those bytes. To avoid this last trap, a more complex logic function, rather than the simple gate 304, is required for generating the pseudo-random sequence. This logic function, which may involve two or more bits of the shift register 306, should ultimately be kept secret by the manufacturer of the smart card in order to prevent any further possibility of reverse-engineering.

It will be apparent from the foregoing that the method of the present invention achieves a very solid level of security in cryptographic communications, without any mathematical operations or complex computer circuitry; rather, the method depends on a relatively simple logic circuit, together with a technique borrowed from a card game.

While the method and the device introduced hereinabove have been illustratively described with reference to specific configurations, it will be recognized that the invention may be variously configured. One important improvement will be to prolong the output sequence of data beyond the 16-byte configuration described above, in order to further increase the number of possible allocations of meaningful data among the irrelevant data generated by the card (though it is very unlikely that a hacker will attempt to fool an ATM or vending system by using the same card number 43,000 times!). Further, the cryptographic method described is generally useful not just for passing a digital signature in the form of a secret key, but for passing any other information as well which may be stored in the memory of the smart card. In addition, while the invention has been shown in a particular embodiment as an intelligent device embedded or laminated on a plastic card, it will be appreciated that the method of the invention is widely useful for cryptographic communications on any digital channel, including the Internet, without departure from the scope of the invention.

Accordingly, while the invention has been described with reference to specific aspects, features, and embodiments, it will be appreciated that various modifications, alternatives, and other embodiments are possible within the broad scope of the invention, and the invention therefore is intended to encompass all such modification, alternatives, and other embodiments, within its scope.

What is claimed is:

1. A handshaking method between a computer and a smart digital system, consisting of:

a test signal, issued by the computer system;

a confirmation signal, issued by the smart digital system;

wherein the confirmation signal comprises a masked form of the test signal, mixed with other irrelevant data, such that the locations of the masked signal within said irrelevant data are known to the computer system.

2. A method according to claim 1, wherein the smart digital system is a computer.

3. A method according to claim 1, wherein the smart digital system is a hardware device attached to a plastic card.

4. A method according to claim 1, wherein the smart digital system generates irrelevant data by means of a pseudo-random bit generator.

5. A method according to claim 4, wherein the pseudo-random bit generator is driven by the masked test signal.

6. A method according to claim 1, wherein the smart digital system comprises cyclic shift registers and control circuitry for allocation of the masked test signal.

7. A method according to claim 1, wherein the masked signal is a digital signature.

8. A method according to claim 1, wherein the masked signal is a secret message.

9. A method according to claim 1, arranged for securing financial transactions.

10. A method according to claim 1, arranged for securing Internet communications.

* * * * *